United States Patent Office 3,816,570
Patented June 11, 1974

3,816,570
PROCESS FOR PREPARING ENAMINE
PHOSPHORUS COMPOUNDS
Wataru Nagata, Nishinomiya, and Yoshio Hayase, Sakai, Japan, assignors to Shionogi & Co., Ltd., Osaka, Japan
No Drawing. Original application Feb. 27, 1969, Ser. No. 830,106, now Patent No. 3,673,284. Divided and this application Apr. 10, 1972, Ser. No. 242,781
Claims priority, application Japan, Mar. 7, 1968, 43/14,901; Mar. 19, 1968, 43/18,134, 43/18,135; Mar. 30, 1968, 43/20,805
Int. Cl. C07f 9/38
U.S. Cl. 260—968
2 Claims

ABSTRACT OF THE DISCLOSURE

Reagents for aldehyde synthesis, particularly for formyl-olefination, of the general formula:

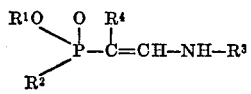

wherein $R^1$ represents a lower alkyl group, $R^2$ represents $R^1O$ or an alkyl, aralkyl or aryl group, $R^3$ represents an acyclic or cyclic alkyl or aryl group, and $R^4$ represents a hydrogen atom, an alkyl, aralkyl or alkoxycarbonyl group or a halogen atom, which react with carbonyl compounds $>C=O$ to yield $\alpha,\beta$-unsaturated aldehydes of the general formula:

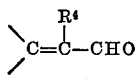

wherein $R^4$ has the same meaning as described above.

---

This is a division of application Serial No. 830,106, filed Feb. 27, 1969, now U.S. Pat. 3,673,284.

The present invention relates to novel reagents for aldehyde synthesis, to processes for the preparation thereof and to uses thereof.

More particularly, the present invention relates to novel reagents for formyl-olefination represented by the general formula:

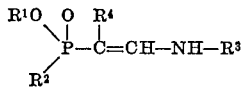

wherein $R^1$ is a lower alkyl group, $R^2$ is a member selected from the group consisting of $R^1O$, a lower alkyl group, an aralkyl group of 7-8 carbon atoms and an aryl group of 6-7 carbon atoms, $R^3$ is a member selected from the group consisting of an acyclic or cyclic alkyl group of 1-6 carbon atoms and an aryl group of 6-7 carbon atoms, and $R^4$ is a member selected from the group consisting of a hydrogen atom, a lower alkyl group, an aralkyl group of 7-8 carbon atoms, a lower alkoxycarbonyl group, and a halogen atom.

The methods for preparing $\alpha,\beta$-unsaturated aldehydes, so-called formyl-olefination, consisting of adding two carbon atoms to carbonyl functions as illustrated by the accompanying equation, have widely been utilized as useful synthetic method in

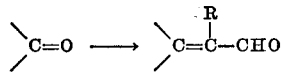

chemical or pharmaceutical industries, particularly in preparations of pharmaceutically useful compounds such as various steroids, vitamin A, vitamin D, carotenoids and other natural products or medicaments or intermediates thereof.

Representative of the methods is indirect one including modifications thereof, consisting of adding an acetylenic anion to a carbonyl compound followed by rearrangement to desired $\alpha,\beta$-unsaturated aldehyde, for example, as illustrated by the following reaction sequence.

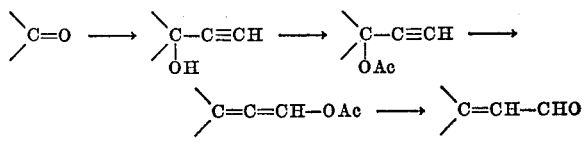

[G. Saucy et al., Helv. Chim. Acta, 42, 1952 (1959).]
However, these methods are disadvantageous in requirement of multi-step reactions or in low yield or in limitation of application.

Alternative most striking methods are so-called aldol-condensation consisting of condensing an active methylene group adjacent to an aldehyde group with another carbonyl group.

In general, the various methods for reacting the compounds involving an active methylene group adjacent to the electron withdrawing group (e.g. nitro group, carbonyl group, sulfonyl group, a carboxylic acid ester, cyano group etc.) with other carbonyl compounds have been known as well as that of the active methylene group adjacent to aldehyde (aldol-condensation). However, these reactions are accompanied by side-reactions undesirable for the objective reaction in many cases, such as self-condensation or polymerization, since the reactions are usually carried out in the presence of a basic catalyst. In order to remove these side-reactions, various methods, for example, Mannich reaction, Darzen condensation, Reformatsky reaction, have been reported. However, the satisfactory process for formyl-olefination has been unknown.

On the contrary, the process for preparing olefins consisting of reacting a carbonyl compound with a phosphonium ylide compound, so-called Wittig reaction, is very useful reaction for introducing the terminal methylene to carbonyl group or further increasing the hydrocarbon chain a well as Grignard reaction. Attempts to apply this reaction to the aldol-condensation type reaction, for example, the reactions by the ylide compounds involving the electron withdrawing group adjacent to the methylene group in the opposite side against the phosphonium group, as indicated by the formulae II-V, have been known. However, the nucleophilicity of the reagents to the carbonyl compounds decreases due to the electron-delocalization, for

| | |
|---|---|
| $(C_6H_5)_3P=CH-CO-C_6H_5$ | II |
| $(C_6H_5)_3P=CH-CO_2C_2H_5$ | III |
| $(C_6H_5)_3P=CH-C\equiv N$ | IV |
| $(C_6H_5)_3P=CH-CHO$ | V | example, as indicated in the following equation. Accordingly, the reactivity of the reagents is remarkably low in comparison

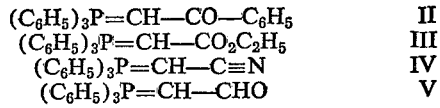

with the Wittig reagents involving no electron withdrawing group in the adjacent position. For example, the above-described compound V reacts with benzaldehyde to yield cinnamic aldehyde, while not reacting with ketones. Furthermore, the compound V does not react with an aldehyde located at the sterically hindered position (e.g. an aldehyde located at the tertiary position) [Trippett and Walker, J. Chem. Soc., 1266 (1961)].

Wadsworth and his co-workers developed the reaction method using phosphonate carbanion as a modification of the Wittig reaction [J. Am. Chem. Soc., 83, 1733 (1961)]. This reaction may be characterized by utilizing the phosphonate carbanion more reactive than the Wittig reagent in order to increase the reactivity of the active methylene compounds involving the electron withdrawing group in the adjacent position. For example, the reactivity of the reagents represented by the following formulae VI—IX, involving the electron withdrawing group in the adjacent position, could considerably be increased

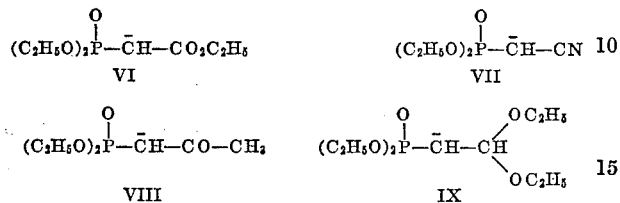

[Bose and Dahill, Jr., Tetrahedron Letters, 959 (1963); ibid., J. Org. Chem., 30, 505 (1965); Takahashi and Ohta, Bull, Chem. Soc. Japan, 35, 1498 (1962); Normant, Comptes Rendus, 256, 1800 (1963)]. However, these compounds, particularly, the compound IX utilizable as a reagent for preparing $\alpha,\beta$-unsaturated aldehyde is readily inactivated in the presence of a basic catalyst by the reaction sequence as follows:

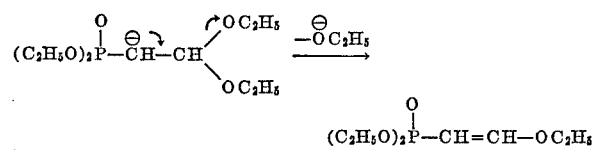

Therefore, in spite of these various attempts, the sufficient process for formyl-olefination has not yet been developed.

The present inventors had studied various methods in order to remove these disadvantages and it has been discovered that the enamine-type phosphonate compounds represented by the above-described general formula I have been excellently effective as reactive agents for preparing $\alpha,\beta$-unsaturated aldehyde by condensing aldehydes involving the active methylene group at the $\alpha$-position with other carbonyl compounds. The reactive agents of the present invention may be applied to all sorts of carbonyl compounds including aldehydes and ketones and effectively show remarkable reactivity even to the hindered carbonyl compounds such as aldehydes located at the tertiary position. Furthermore, the method of the present invention is much more effective than the above-mentioned other methods in stability of the reagents in reaction medium, in easiness of the reaction procedure, in improvement of the yield or in stereospecificity.

Each substituent of the reagents represented by the above-mentioned general formula I is more precisely indicated as follows: $R^1$ represents a lower alkyl group such as methyl, ethyl, n-propyl, n-butyl or the like, $R^2$ has the same meaning as $R^1O$ or is a member selected from the group consisting of a lower alkyl group such as methyl, ethyl, n-propyl, n-butyl or the like, an aralkyl group of 7–8 carbon atoms such as benzyl, phenylethyl, tolubenzyl or the like, and an aryl group of 6–7 carbon atoms such as phenyl, tolyl or the like, $R^3$ is a member selected from the group consisting of an acyclic or cyclic alkyl group of 1–6 carbon atoms such as methyl, ethyl, n-propyl, i-propyl, n-butyl, i-butyl, s-butyl, t-butyl, n-pentyl, i-pentyl, s-pentyl, t-pentyl, n-hexyl, cyclopentyl cyclohexyl or the like, and an aryl group of 6–7 carbon atoms, and $R^4$ is a member selected from the group consisting of a hydrogen atom, a lower alkyl group such as methyl, ethyl, n-propyl i-propyl, n-butyl, n-pentyl, n-hexyl or the like, an aralkyl group of 7–8 carbon atoms such as benzyl, phenylethyl, tolubenzyl or the like, a lower alkoxycarbonyl group such as methoxycarbonyl, ethoxycarbonyl or the like, and a halogen atom such as chlorine, bromine or iodine atom.

Representative of the reagents (I) of the present invention are:

Dimethylphosphonoacetaldehyde methylamine enamine,
Dimethylphosphonoacetaldehyde i-propylamine enamine,
Dimethylphosphonoacetaldehyde t-butylamine enamine,
Dimethylphosphonoacetaldehyde cyclohexylamine enamine,
Diethylphosphonoacetaldehyde methylamine enamine,
Diethylphosphonoacetaldehyde i-propylamine enamine,
Diethylphosphonoacetaldehyde t-butylamine enamine,
Diethylphosphonoacetaldehyde cyclohexylamine enamine,
Diethylphosphonoacetaldehyde analine enamine,
Di-n-propylphosphonoacetaldehyde t-butylamine enamine,
Di-n-propylphosphonoacetaldehyde cyclohexylamine enamine,
2-Dimethylphosphonopropionaldehyde t-butylamine enamine,
2-Dimethylphosphonopropionaldehyde cyclohexylamine enamine,
2-Diethylphosphonopropionaldehyde t-butylamine enamine,
2-Diethylphosphonopropionaldehyde cyclohexylamine enamine,
2-Diethylphosphono-n-butyraldehyde t-butylamine enamine,
2-Diethylphosphono-n-butyraldehyde cyclohexylamine enamine,
2-Diethylphosphono-n-valeraldehyde t-butylamine enamine,
2-Diethylphosphono-n-valeraldehyde cyclohexylamine enamine,
2-Diethylphosphono-3-phenylpropionaldehyde cyclohexylamine enamine,
2-Diethylphosphono-3-(N-cyclohexyl)aminoacrylic acid ethyl ester,
2-Diethylphosphono-2-bromoacetaldehyde cyclohexylamine enamine,
2-Diethylphosphono-2-chloroacetaldehyde t-butylamine enamine,
Ethyl-2-cyclohexylaminovinyl phenylphosphinate,
Ethyl-1-methyl-2-cyclohexylaminovinyl phenylphosphinate,
Ethyl-1-ethyl-2-cyclohexylaminovinyl phenylphosphinate,
Ethyl-(1-benzyl-2-cyclohexylamino)vinyl phenylphosphinate,
Ethyl-2-t-butylaminovinyl phenylphosphinate,
Ethyl-(1-methyl-2-t-butylamino)vinyl phenylphosphinate,
Ethyl-(1-benzyl-2-t-butylamino)vinyl phenylphosphinate,
Ethyl-2-t-butylaminovinyl ethylphosphinate, and
Ethyl-2-cyclohexylamino ethylphosphinate.

The reagents (I) of the present invention may be prepared from the compounds of the general formula X as illustrated by the following reaction sequence,

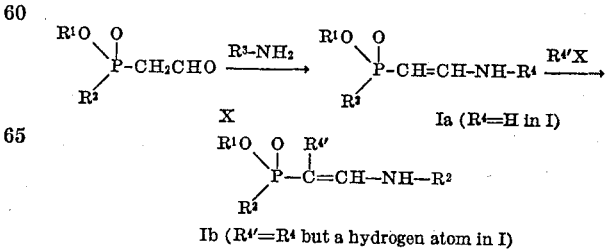

Ib ($R^{4\prime}=R^4$ but a hydrogen atom in I)

wherein $R^1$, $R^2$, $R^3$ and $R^4$ each has the same meanings as described above.

The compounds (X) in the above-described reaction sequence may be prepared according to the known method as follows:

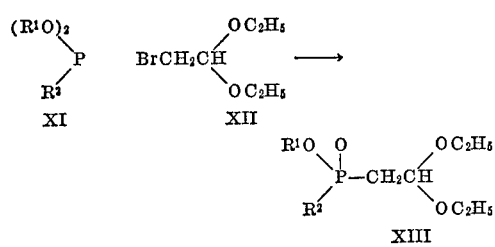

wherein $R^1$ and $R^2$ each has the same meanings as described above, the acetal derivative of α-bromoacetaldehyde of the general formula XII is subjected to reaction with the phosphite derivative of the general formula XI and then the acetal protecting group of the resulting phosphinate derivative (XIII) is removed to the compound (X).

The reagents (Ia: $R^4$=H in I) can be prepared by reacting the compounds (X) with the primary amines represented by the general formula $R^3$—$NH_2$ in a suitable solvent (e.g. methanol, ethanol, n-propanol, t-butanol, benzene, toluene, tetrahydrofuran etc.) or without any solvent at a temperature ranging from 0° C. to 120° C. The reaction may be carried out according to the process for preparing so-called Schiff-base or the process for enamine formation.

The reagents (Ib: $R^{4'}$=$R^4$ but a hydrogen atom in I) can be prepared by further reacting the compounds (Ia) with the compounds, capable of releasing the radical $R^{4'}$ represented by the general formula $R^{4'}X$ in the presence of a catalyst.

The compounds of the general formula $R^4X$ are alkyl halogenides consisting of an alkyl group such as methyl, ethyl, n-propyl, i-propyl, n-butyl, n-pentyl, n-hexyl or the like and a halogen atom such as chlorine, bromine or iodine atom (e.g. methyl iodide, ethyl bromide, n-butyl iodide, n-hexyl bromide etc.), aralkyl halogenides consisting of an aralkyl group such as benzyl, phenylethyl, tolubenzyl or the like and a halogen atom (e.g. benzyl chloride, phenylethyl bromide, tolubenzyl iodide etc.), lower alkoxycarbonyl halides such as methyl chloroformate, ethyl chloroformate or the like, and halogenating agents. The halogenating agents in this process mean the reagents producing the positively charged halogen atom in the reaction medium, for example, chlorine ($Cl_2$), bromine ($Br_2$), iodine ($I_2$), cyanogen bromide, cyanogen iodide, N-bromoacetamide (NBA), N-bromosuccinimide (NBS), N-chlorosuccinimide (NCS), N-chloro-p-toluenesulfonamide (chloramine N-chlorobenzenesulfonamide (chlormine-B), t-butyl hypochlorite, pyridinium bromide perbromide and the like.

The reaction of the compounds (Ia) with the compounds $R^{4'}X$ is usually carried out in a suitable inert solvent in the presence of a catalyst under cooling or at room temperature (about −30-40° C.), if necessary, under heating (such as refluxing temperature). The catalysts used in the reaction are, for example, lithium, sodium, lithium hydride, sodium hydride, sodium amide, potassium amide, Grignard reagents such as ethylmagnesium bromide, methylmagnesium iodide, ethylmagnesium chloride and the like, and organo metal compounds such as butyl lithium, phenyl lithium and the like. The preferred solvents are ethers such as diethyl ether, tetrahydrofuran, 1,2-dimethoxyethane, diglyme and the like, and hydrocarbon solvents such as benzene, toluene, xylene and the like.

The resulting reagents (I) of the present invention may be applied to preparation of α,β-unsaturated aldehydes (XIV) increasing two carbon atoms from carbonyl compounds >C=O as illustrated by the following reaction sequence:

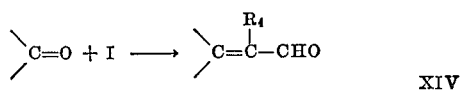

wherein $R^4$ has the same meanings as described above.

The carbonyl compounds applicable to the reagents (I) in the present invention are those, involving aldehyde or ketone, of acyclic compounds, monocyclic or polycyclic compounds such as terpenes, steroids, carotenoids or the like, or mono or poly-condensed aromatic compounds (i.e. aldehydes located at the primary, secondary or tertiary position, aromatic aldehydes, acyclic ketones, cyclic ketones, aromatic ketones etc.).

The reaction of the reagents (I) with the carbonyl compounds >C=O is usually carried out in an aprotic solvent in the presence of a basic catalyst. The usual reaction procedure may be indicated as follows: the reagent represented by the general formula (I) is dissolved in an aprotic solvent with a basic catalyst to form the anion represented by the following general formula:

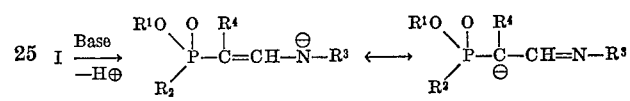

wherein $R^1$, $R^2$, $R^3$ and $R^4$ each has the same meanings as described above, and then the starting carbonyl compound >C= is added to this solution. However, the reaction is not always carried out according to such successive procedure. For example, the reaction may also be carried out by adding the basic catalyst into the previously prepared solution of the starting carbonyl compound and the reagent (I) in an aprotic solvent.

The basic catalysts used are metal alcoholate such as sodium methoxide, potassium methoxide, sodium ethoxide, potassium ethoxide, potassium t-butoxide, sodium t-butoxide and the like, sodium amide, potassium amide, lithium diethylamide, sodium hydride, lithium hydride, lithium triphenylmethide, methyl lithium, butyl lithium or Grignard reagents such as methyl-magnesium bromide, ethylmagnesium bromide and the like.

Aprotic solvents, i.e. the solvent releasing no proton, are, for example, ethers such as diethyl ether, tetrahydrofuran, 1,2-dimethoxyethane and the like, hydrocarbon solvents such as benzene, toluene, xylene and the like, N,N-dimethylformamide and the like.

The reaction temperature may be set according to the reactivity of the carbonyl compounds applied and the reaction may be carried out at room temperature or under cooling or sometimes under heating. Moreover, the reaction is preferably carried out under an inert gas such as nitrogen or argon, because of the reaction in the presence of a strongly basic catalyst. Furthermore, the reaction is preferably carried out under stirring in order to effectively proceed the reaction.

The products obtained in the above-described process are the Schiff-bases involving the partial structure represented by the general formula XV,

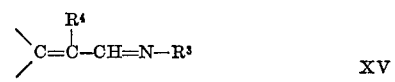

wherein $R^3$ and $R^4$ each has the same meanings as described above. Accordingly, the products must be hydrolyzed as usual manner with an acid or base to regenerate the aldehyde group. In general, the products without the isolation as the intermediates are preferably subjected to the acid hydrolysis consisting of the two phase system. The preferred acid medium is a diluted solution of oxalic acid or a buffer solution such as acetic acid-sodium acetate-water, tartaric acid-sodium tartarate-water or the like.

Thus resulting α,β-unsaturated aldehydes (XIV) may be isolated and purified according to the usual isolation and purification procedure used in the general synthetic chemistry, for example, extraction, distillation, recrystallization, column chromatography, thin layer chromatography, gas chromatography, or the methods by so-called carbonyl reagents (e.g. Girard reagents, hydrazone, semicarbazone, oxime etc.).

The invention will be better explained by the following examples which are not intended as a limitation thereof.

EXAMPLE 1

Diethylphosphonoacetaldehyde cyclohexylamine enamine

To a solution of 30.2 g. of diethylphosphonoacetaldehyde in 90 ml. of anhydrous methanol, there is added 19.2 ml. of purified cyclohexylamine in nitrogen atmosphere under ice-cooling and stirring. The reaction mixture is kept at room temperature for 10 minutes under stirring and then the solvent is distilled off under reduced pressure. The residue is dissolved in 150 ml. of anhydrous ether, dried over anhydrous potassium carbonate, and then evaporated under reduced pressure. The resulting residue is purified by highly vacuum distillation in the presence of 300 mg. of potassium carbonate to afford 33.06 g. of diethylphosphonoacetaldehyde cyclohexylamine enamine (75.4% yield) having b.p. 151–152° C./0.04 mm. Hg. The purity of this substance is confirmed by gas chromotography.

UV: $\lambda_{max}^{EtOH}$ 241 m$\mu$ ($\epsilon$ 16,300). IR: $\nu_{max}^{CCl_4}$ 3255, 1633 (shoulder), 1620, 1211, 1058, 1035, 955 cm.$^{-1}$.

NMR: $\delta$ (CCl$_4$) 1.25 (triplet), 3.25 (multiplet), 3.85 (multiplet), 6.7 (multiplet) p.p.m. Anal.—Calcd. for $C_{12}H_{24}O_3NP$: C, 55.15; H, 9.26; N, 5.36; P, 11.86. Found: C, 54.54; H, 9.55; N, 5.43; P, 12.08.

EXAMPLE 2

According to the same procedure as Example 1, dimethylphosphonoacetaldehyde t-butylamine enamine, diethylphosphonoacetaldehyde t-butylamine enamine, ethyl-2-cyclohexylaminovinyl phenylphosphinate, and ethyl-2-t-butylaminovinyl ethylphosphinate are prepared, respectively.

EXAMPLE 3

2-diethylphosphonopropionaldehyde cyclohexylamine enamine

To a solution of 10.0 g. of diethylphosphonoacetaldehyde cyclohexylamine enamine in 30 ml. of anhydrous tetrahydrofuran, there is added dropwise 22.0 ml. of ethylmagnesium bromide-tetrahydrofuran solution (2.31 mM./ml.) within a period of 20 minutes under ice-cooling and stirring. After stirring for 40 minutes at room temperature, a solution of 8.10 g. of methyl iodide in 10 ml. of anhydrous tetrahydrofuran is added dropwise and then the reaction mixture is refluxed for 1.5 hours. After cooling, the reaction mixture is poured into ice-water, extracted with dichloromethane-ether (1:3), washed with saturated sodium chloride aqueous solution and then evaporated under reduced pressure to yield 7.09 g. of residue, which on crystallization from ether-pentane affords 7.00 g. of 2 - diethylphosphonopropionaldehyde cyclohexylamine enamine (66.6% yield) having m.p. 61–64° C./73° C. (double melting point).

UV: $\lambda_{max}^{EtOH}$ 246 m$\mu$ ($\epsilon$ 24,200). IR: $\nu_{max}^{CCl_4}$ 3265, 1642, 1221, 1057, 1031, 951 cm.$^{-1}$.

Anal.—Calcd. for $C_{13}H_{26}O_3NP$: C, 56.71; H, 9.52; N, 5.09; P, 11.25. Found: C, 56.52; H, 9.59; N, 5.25; P, 11.20.

EXAMPLE 4

2-diethylphosphono-3-phenylpropionaldehyde cyclohexylamine enamine

To a solution of 2.85 g. of diethylphosphonoacetaldehyde cyclohexylamine enamine in 10.0 ml. of anhydrous tetrahydrofuran, there is added dropwise 6.86 ml. of 2.39 N ethylmagnesium bromide-tetrahydrofuran solution within a period of 10 minutes under ice-cooling and stirring. After stirring for 1 hour under ice-cooling, a solution of 1.38 g. of benzyl chloride in 4.0 ml. of anhydrous tetrahydrofuran is added dropwise within a period of 5 minutes and then the reaction mixture is refluxed for 22 hours. After cooling, the reaction mixture is poured into ice-water, extracted with ether, washed with water, dried over anhydrous sodium sulfate and then evaporated to dryness to yield 3.09 g. of residue, which on crystallization from ether-pentane affords 2.72 g. of 2-diethylphosphono-3-phenylpropionaldehyde cyclohexylamine enamine (71.2% yield) having m.p. 79–82° C.

UV: $\lambda_{max}^{EtOH}$ 246.5 m$\mu$ ($\epsilon$ 15,960). IR: $\nu_{max}^{CCl_4}$ 3406, 1636, 1603, 1235, 1057, 1031, 950 cm.$^{-1}$.

Anal.—Calcd. for $C_{19}H_{30}O_3NP$: C, 64.93; H, 8.61; N, 3.99; P, 88.2. Found: C, 65.35; H, 8.92; N, 4.04; P, 9.16.

EXAMPLE 5

According to the same procedure as Examples 3 and 4, 2-diethylphosphonopropionaldehyde t-butylamine enamine, ethyl - 1 - methyl-2-cyclohexaminovinyl phenylphosphinate, and ethyl-(1-benzyl-2-cyclohexylamino)vinyl phenylphosphinate are prepared, respectively.

EXAMPLE 6

2-diethylphosphono-3-(N-cyclohexyl)aminoacrylic acid ethyl ester

To a solution of 4.00 g. of diethylphosphonoacetaldehyde cyclohexylamine enamine in 12.0 ml. of anhydrous tetrahydrofuran, there is added dropwise 9.6 ml. of 2.39 N ethylmagnesium bromide-tetrahydrofuran solution within a period of 10 minutes under ice-cooling and stirring. After stirring for 1 hour at room temperature, a solution of 1.65 g. of ethyl chloroformate in 10 ml. of anhydrous tetrahydrofuran is added dropwise within a period of 5 minutes under ice-cooling and then the reaction mixture is stirred for additional 3 hours at the same temperature. The reaction mixture is poured into ice-water, extracted with ether, washed with water, dried over anhydrous sodium sulfate and then evaporated to dryness to yield 4.37 g. of residue, which on purification by highly vacuum distillation affords 4.12 g. of 2-diethylphosphono-3-(N-cyclohexyl)aminoacrylic acid ethyl ester (80.4% yield) having b.p. 110–147° C./0.002–0.003 mm. Hg.

UV: $\lambda_{max}^{EtOH}$ 240, 274 m$\mu$ ($\epsilon$ 12,500, 9,130). IR: $\nu_{max}^{film}$ 3431, 3271, 1725, 1686, 1661, 1616 cm.$^{-1}$.

Anal.—Calcd. for $C_{15}H_{28}O_5NP$: C, 54.04; H, 8.47; N, 4.20; P, 9.29. Found: C, 54.04; H, 8.63; N, 4.02; P, 9.64.

EXAMPLE 7

2-diethylphosphono-2-bromoacetaldehyde cyclohexylamine enamine

To a solution of 5.00 g. of diethylphosphonoacetaldehyde cyclohexylamine enamine in 15.0 ml. of anhydrous tetrahydrofuran, there is added dropwise 11.3 ml. of 2.39 N ethylmagnesium bromide-tetrahydrofuran solution within a period of 10 minutes under ice-cooling and stirring. After stirring for 30 minutes at room temperature, a solution of 2.02 g. of cyanogen bromide in 10.0 ml. of anhydrous tetrahydrofuran is added dropwise within a period of 5 minutes under ice-cooling and then the reaction mixture is stirred for 2.5 hours at room temperature. The reaction mixture is poured into ice-water, extracted with ether, washed with water, dried over anhydrous sodium sulfate and then evaporated to dryness to yield 5.96 g. of crude crystals, which on recrystalliza- from ether-pentane afford 4.94 g. of 2-diethylphosphono- 2-bromoacetaldehyde cyclohexylamine enamine (75.8% yield) having m.p. 79–80° C.

UV: $\lambda_{max.}^{EtOH}$ 245 m$\mu$ ($\epsilon$ 16,700). IR: $\nu_{max.}^{CCl_4}$ 3371, 1635, 1242, 1056, 1031, 962 cm.$^{-1}$.

Anal.—Calcd. for $C_{12}H_{23}O_3NPBr$: C, 42.36; H, 6.81; N, 4.12; P, 9.11; Br, 23.49. Found: C, 42.26; H, 2.06; N, 4.24; P, 9.84; Br, 23.62.

EXAMPLE 8

5$\beta$-formylethylene-6$\beta$-vinyl-B-nor-androstan-3$\alpha$-ol

To a mixture of 386 mg. of 52.9% sodium hydride and 1.5 ml. of tetrahydrofuran, there is added a solution of 2.221 g. of diethylphosphonoacetaldehyde cyclohexyl- amine enamine in 14.5 ml. of anhydrous tetrahydrofuran under ice-cooling and stirring, and then stirring is con- tinued for 15 minutes. A solution of 1.19 g. of 5$\beta$-formyl- 6$\beta$-vinyl-B-nor-androstan-3$\alpha$-ol benzoate in 7.0 ml. of an- hydrous tetrahydrofuran is then added and the resulting solution is kept at room temperature for 3.5 hours under stirring. Further, 300 mg. of paraformaldehyde is added under ice-cooling and the reaction mixture is stirred for 30 minutes, then poured into ice-water, and extracted with ether-dichloromethane (4:1). The extract is washed with saturated sodium chloride aqueous solution and the solvent is evaporated to dryness to yield 2.686 g. of resi- due. To a solution of this residue in 25 ml. of benzene, there is added 1.7 g. of oxalic acid and 75 ml. of water. After the solution is kept overnight at room temperature under stirring, the benzene layer is separated and the aqueous layer is extracted with ether-dichloromethane (6:1). The extract combined with the benzene layer is washed with saturated sodium chloride aqueous solution and then the solvent is evaporated to dryness to yield 1.658 g. of residue. The residue is dissolved in 130 ml. of methanol and heated with 40 ml. of 2 N-potassium carbonate solution for 20 minutes under refluxing. The reaction mixture is concentrated under reduced pressure, poured into ice-water, and then extracted with ether- dichloromethane (4:1). The extract is evaporated under reduced pressure to yield 1.339 g. of residue, which is passed through a column of 30 g. of silica gel (contain- ing 3% of water). Eluate with benzene-chloroform (1:1) is recrystallized from ether-pentane to afford 840 mg. of 5$\beta$-formylethylene - 6$\beta$ - vinyl - B - nor-androstan-3$\alpha$-ol (87% yield) having m.p. 62–65° C.

EXAMPLE 9

3-formylmethylene-5$\alpha$-androstan-17$\beta$-ol benzoate

To a mixture of 73 mg. of 52.9% sodium hydride and 1.0 ml. of tetrahydrofuran, there is added a solution of 398 mg. of diethylphosphonoacetaldehyde cyclohexyl- amine enamine in 2.0 ml. of anhydrous tetrahydrofuran under ice-cooling and stirring, and then the stirring is continued for 15 minutes. A solution of 500 mg. of 17$\beta$-benzoyloxy-5$\alpha$-androstan-3-one in 4.0 ml. of an- hydrous tetrahydrofuran is then added and the resulting solution is kept at room temperature for 3.5 hours under stirring. The reaction mixture is poured into ice-water and the product is extracted with ether, washed with water and evaporated to dryness to yield 782 mg. of resi- due. To a solution of this residue in 30 ml. of benzene, there is added 800 mg. of oxalic acid and 90 ml. of water. After the solution is kept at room temperature for 17 hours under stirring, the benzene layer is separated and the aqueous layer is extracted with ether. The extract combined with the benzene layer is washed with water and evaporated to dryness to yield 551 mg. of crystalline residue, which on recrystallization from ether affords 426 mg. of 3-formylmethylene-5$\alpha$-androstan-17$\beta$-ol benzoate (80% yield) having m.p. 157–158° C.

UV: $\lambda_{max.}^{EtOH}$ 236 m$\mu$ ($\epsilon$ 21,700). IR: $\nu_{max.}^{CCl_4}$ 2783, 1683, 1632, cm.$^{-1}$. NMR: $\delta$ (CDCl$_3$) 5.82 (doublet), 10.30 (doublet) p.p.m.

Anal.—Calcd. for $C_{28}H_{36}O_3$: C, 79.96; H, 8.63. Found: C, 79.49; H, 8.68.

EXAMPLE 10

3$\beta$-hydroxy-17(20)-5$\alpha$-pregnen-21-al

To a mixture of 59.7 mg. of 52.9% sodium hydride and 1.0 ml. of tetrahydrofuran, there is added a solution of 342 mg. of diethylphosphonoacetaldehyde cyclohexyl- amine enamine in 2.0 ml. of anhydrous tetrahydrofuran under ice-cooling and stirring, and then stirring is con- tinued for 15 minutes. A solution of 164 mg. of 3$\beta$-tetra- hydropyranyloxy-5$\alpha$-androstan-17-one in 1.5 ml. of an- hydrous tetrahydrofuran is then added and the resulting solution is kept at room temperature for 10 hours under stirring. The reaction mixture is poured into ice-water and the product is extracted with ether, washed with water and evaporated to dryness to yield 343 mg. of residue. To a solution of this residue in 12 ml. of benzene, there is added 445 mg. of oxalic acid and 36 ml. of water. After the solution is kept at room temperature for 22 hours under stirring, the benzene layer is separated and the aqueous layer is extracted with ether. The extract combined with the benzene layer is washed with 2 N hydrochloric acid and then with water and evaporated to dryness to yield 208 mg. of residue. The residue is dissolved in 20 ml. of 70% acetic acid and heated at 60–70° C. for 30 minutes. The reaction mixture is evap- orated under reduced pressure, poured into ice-cooled saturated potassium carbonate aqueous solution and then extracted with ether. The extract is washed with water and evaporated to dryness to yield 132 mg. of crude crystals, which on recrystallization from dichlorometh- ane-ether afford 99 mg. of 3$\beta$-hydroxy-17(20)-5$\alpha$-preg- nen-21-al (71.2% yield) having m.p. 176–180° C.

UV: $\lambda_{max.}^{EtOH}$ 245 m$\mu$ ($\epsilon$ 14,500). IR: $\nu_{max.}^{CHCl_3}$ 2758, 1669, 1640, 1610 cm.$^{-1}$. NMR: $\delta$ (CDCl$_3$) 5.69 (multiplet), 9.78 (doublet) p.p.m.

Anal.—Calcd. for $C_{21}H_{32}O_2$: C, 79.70; H, 10.19. Found: C, 79.07; H, 10.12.

EXAMPLE 11

5$\alpha$-formylethylenepregnane-3,20-dione

To a mixture of 105 mg. 52.9% sodium hydride and 0.5 ml. of tetrahydrofuran, there is added a solution of 605 mg. of diethylphosphonoacetaldehyde cyclohexyl- amine enamine in 1.0 ml. of anhydrous tetrahydrofuran under ice-cooling and stirring, and then stirring is con- tinued for 15 minutes. Then a solution of 100 mg. of 3,3:20,20-bisethylenedioxy-5$\alpha$-formylpregnane in 2.0 ml. of anhydrous tetrahydrofuran is added and the resulting solution is refluxed for 9 hours. Thereafter, according to the same procedure as Example 3, the reaction product is treated with 840 mg. of oxalic acid and 30 ml. of water and then with 30 ml. of 70% acetic acid. Thus resulting product is crystallized from ether to afford 71 mg. of 5$\alpha$ - formylethylenepregnane-3,20-dione (82.7% yield) having m.p. 140–144° C.

UV: $\lambda_{max.}^{dioxane}$ 220.5 m$\mu$ ($\epsilon$ 13,850). IR: $\nu_{max.}^{CHCl_3}$ 2736, 1695, 1623 cm.$^{-1}$. NMR: $\delta$ (CDCl$_3$) 6.13 (quartet, J=16 c.p.s.), 7.27 (doublet, J=16 c.p.s.), 9.52 (doublet) p.p.m.

Anal.—Calcd. for $C_{24}H_{34}O_3$: C, 77.80; H, 9.25. Found: C, 77.80; H, 9.25.

EXAMPLE 12

17(20)-5$\alpha$-pregnen-21-al

To a mixture of 99 mg. of 52.9% sodium hydride and 1.4 ml. of tetrahydrofuran, there is added a solution of 568 mg. of diethylphosphonoacetaldehyde cyclohexyl- amine enamine in 2.2 ml. of anhydrous tetrahydrofuran under ice-cooling and stirring, and then stirring is continued for 15 minutes. Then, a solution of 200 mg. of 5α-androstan-17-one in 1.4 ml. of anhydrous tetrahydrofuran is added and the resulting solution is kept at room temperature for 10 hours. The reaction mixture is treated in usual manner, and the product is dissolved in 35 ml. of benzene. The solution, to which is added 1.05 g. of oxalic acid and 105 ml. of water, is kept at room temperature for 13 hours under stirring. Thereafter, the product worked up as usual manner is crystallized from ether to afford 162 mg. of 17(20)-5α-pregnen-21-al (74.0% yield) having m.p. 150–152° C.

UV: $\lambda_{max.}^{EtOH}$ 245 m$\mu$ ($\epsilon$ 16,500). IR: $\nu_{max.}^{CHCl_3}$ 2758, 1670, 1640, 1610, cm.$^{-1}$. NMR: $\delta$ (CDCl$_3$) 5.73 (multiplet), 9.87 (doublet) p.p.m.

Anal.—Calcd. for $C_{21}H_{32}O$: C, 83.94; H, 10.73. Found: C, 83.69; H, 10.78.

EXAMPLE 13

Cinnamic aldehyde

To a mixture of 653 mg. of 52.9% sodium hydride and 6.5 ml. of tetrahydrofuran, there is added a solution of 3.76 g. of diethylphosphonoacetaldehyde cyclohexylamine enamine in 20 ml. of anhydrous tetrahydrofuran under ice-cooling and stirring, and then stirring is continued for 15 minutes. Then, a solution of 1.27 g. of benzaldehyde in 13 ml. of anhydrous tetrahydrofuran is added and the resulting solution is kept at room temperature for 2 hours under stirring. Thereafter, the product worked up as usual manner is purified by vacuum distillation to afford 1.22 g. of cinnamic aldehyde (77.2% yield) having b.p. 78° C./1.0 mm. Hg.

UV: $\lambda_{max.}^{EtOH}$ 287 m$\mu$ ($\epsilon$ 22,400). IR: $\nu_{max.}^{CCl_4}$ 1692, 1630 cm.$^{-1}$.

Semicarbazone: m.p. 206–209° C.

UV: $\lambda_{max.}^{EtOH}$ 312 m$\mu$ ($\epsilon$ 34,900).

Anal.—Calcd. for $C_{10}H_{11}ON_3$: C, 63.47; H, 5.86; N, 22.21. Found: C, 63.42; H, 5.85; N, 22.44.

EXAMPLE 14

3,3-ethylenedioxy-11β-hydroxy-5,17(20)-pregnadien-21-al

To a mixture of 39 mg. of 52.9% sodium hydride and 0.5 ml. of tetrahydrofuran, there is added a solution of 226 mg. of diethylphosphonoacetaldehyde cyclohexylamine enamine in 1.5 ml. of anhydrous tetrahydrofuran under ice-cooling and stirring, and then stirring is continued for 15 minutes. Then, a solution of 100 mg. of 3,3-ethylenedioxy-11β-hydroxy-5-androsten-17-one in 1.0 ml. of anhydrous tetrahydrofuran is added and the resulting solution is kept at room temperature for 19 hours under stirring. The reaction mixture is poured into ice-water, extracted with dichloromethane, washed with water, dried over anhydrous sodium sulfate and evaporated to dryness to yield 234 mg. of residue. The residue is dissolved in a mixture of dichloromethane and tetrahydrofuran (5:1) and treated with a buffer solution (pH 4.1), prepared from 10 ml. of 0.385 M tartaric acid and 10 ml. of 0.385 M sodium hydroxide, at room temperature for 38 hours under stirring. The reaction mixture is poured into water, extracted with dichloromethane, washed with water, dried over anhydrous sodium sulfate and evaporated to dryness to yield 149 mg. of residue, which is passed through a column of 3 g. of alumina. Eluate with benzene or benzene-dichloromethane (1:1) is recrystallized from dichloromethane-ether to afford 69 mg. of 3,3-ethylenedioxy-11β-hydroxy-5,17(20)-pregnadien-21-al having m.p. 224–226° C. Anal.—Calcd. for $C_{23}H_{32}O_4$: C, 74.16; H, 8.66. Found: C, 73.94; H, 8.63.

EXAMPLE 15

Cyclohexylidene acetaldehyde

According to the same procedure as the above Examples, cyclohexanone is subjected to reaction with diethylphosphonoacetaldehyde cyclohexylamine enamine to yield cyclohexylidene acetaldehyde having b.p. 88–89° C./16 mm. Hg.

UV: $\lambda_{max.}^{EtOH}$ 240 m$\mu$ ($\epsilon$ 15,200). IR: $\nu_{max.}^{CCl_4}$ 1682 cm.$^{-1}$. NMR: $\delta$ (CDCl$_3$) 6.86, 9.93 p.p.m.

From the signals of IR and NMR spectra, the contamination of a small quantity of deconjugated aldehyde, i.e. cyclohexenyl acetaldehyde, is recognized.

Thus resulting oily cyclohexylidene acetaldehyde is then subjected to reaction with sodium acetate and semicarbazidehydrochloride in ethanol to yield the semicarbazone (86.4% yield from cyclohexanone) having m.p. 212–213° C.

UV: $\lambda_{max.}^{EtOH}$ 273.5 m$\mu$ ($\epsilon$ 34,000).

EXAMPLE 16

2-cyclohexylidenepropionaldehyde

To a mixture of 82 mg. of 52.9% sodium hydride and 0.5 ml. of tetrahydrofuran, there is added a solution of 497 mg. of 2-diethylphosphonopropionaldehyde cyclohexylamine enamine in 1.0 ml. of anhydrous tetrahydrofuran under ice-cooling and stirring. The stirring is continued for 15 minutes and a solution of 147 mg. of cyclohexanone in 1.0 ml. of anhydrous tetrahydrofuran is then added. The reaction mixture is kept at room temperature for 5.5 hours under stirring and then poured into ice-water. The product is extracted with ether and washed with saturated sodium chloride aqueous solution, then the basic portion extracted with 20% tartaric acid. To the tartaric acid layer is added potassium carbonate under ice-cooling to be slightly basic. The precipitated product is extracted with ether, washed with saturated sodium chloride aqueous solution and evaporated to dryness to yield crude crystals, which on recrystallization from ether-pentane afford the intermediary Schiff-base having m.p. 77–78° C.

UV: $\lambda_{max.}^{EtOH}$ 246.5 m$\mu$ ($\epsilon$ 24,200). IR: $\nu_{max.}^{CCl_4}$ 2664, 1632, 1614 cm.$^{-1}$.

Anal.—Calcd. for $C_{15}H_{25}N$: C, 82.13; H, 11.49; N, 6.38. Found: C, 82.00; H, 11.69; N, 6.15.

To a solution of this intermediary Schiff-base in 23 ml. of benzene, there is added 718 mg. of oxalic acid and 70 ml. of water and the solution is then refluxed for 1 hour under nitrogen atmosphere. After cooling, the benzene layer is separated and the aqueous layer is extracted with ether. The extract combined with the benzene layer is washed with 2 N sodium carbonate and saturated sodium chloride aqueous solution and evaporated to dryness to yield 152 mg. of residue. The residue is purified by vacuum distillation to afford 129 mg. of 2-cyclohexylidenepropionaldehyde (62.6% yield from cyclohexanone) having b.p. 60° C./0.10–0.15 mm. Hg (bath temperature). On the other hand, the residue obtained by the reaction with oxalic acid, without distilling, may be immediately converted to the 2,4-dinitrophenylhydrazone as crystals having m.p. 187–190° C. in 66.2% yield from cyclohexanone.

2,4-Dinitrophenylhydrazone: recrystallized from dichloromethane-ethanol.

UV: $\lambda_{max.}^{EtOH}$ 223 m$\mu$ ($\epsilon$ 13,400), 259 (14,750), 295 (8,900), 389 (25,600). IR: $\nu_{max.}^{CHCl_3}$ 3292, 1619, 1596, 1334, 1137, 834 cm.$^{-1}$.

Anal.—Calcd. for $C_{15}H_{18}O_4N_4$: C, 56.59; H, 5.70; N, 17.60. Found: C, 56.50; H, 5.70; N, 17.40.

EXAMPLE 17

2-cyclohexylidene-3-phenylpropionaldehyde

To a mixture of 187 mg. of 52.9% sodium hydride and 1.5 ml. of tetrahydrofuran, there is added a solution of 2.905 g. of 3-phenyl-2-diethylphosphonopropionaldehyde cyclohexylamine enamine in 4.0 ml. of anhydrous tetrahydrofuran under ice-cooling and stirring. The stirring is continued for 15 minutes and a solution of 405 mg. of cyclohexanone in 4.0 ml. of anhydrous tetrahydrofuran is then added. The reaction mixture is refluxed for 3 hours. After cooling, the reaction mixture is poured into ice-water, extracted with ether, washed with saturated sodium chloride aqueous solution and evaporated to dryness to yield 2.496 g. of residue. A portion (1.704 g.) of this residue is dissolved in 50 ml. of benzene and treated, according to the same procedure as Example 9, with 3.63 g. of oxalic acid and 146 ml. of water to yield 1.271 g. of residue. The residue is passed through a column of silica gel (Woelm; containing 10% of water) and eluted with benzene or benzene-dichloromethane (1:1) to afford 408 mg. of cyclohexylidene-3-phenylpropionaldehyde (67.3% yield 2.496 g. of residue. A portion (1.704 g.) of this having m.p. 162–174° C. (recrystallized from dichloromethane-ethanol).

IR: $\nu_{max.}^{Nujol}$ 3294, 1613, 1594, 1515, 1326, 1134, 835 cm.$^{-1}$.

Anal.—Calcd. for $C_{21}H_{22}O_4N_4$: C, 63.94; H, 5.62; N, 14.21. Found: C, 63.64; H, 5.66; N, 14.50.

EXAMPLE 18

3,3-ethylenedioxy-11-oxo-5,17(20)-pregnadien-21-al

To a mixture of 26.9 mg. of 52.9% sodium hydride and 0.4 ml. of anhydrous tetrahydrofuran, there is added a solution of 155 mg. of diethylphosphonoacetaldehyde cyclohexylamine enamine in 1.0 ml. of anhydrous tetrahydrofuran under ice-cooling and stirring. The stirring is continued for 15 minutes and a solution of 68 mg. of 3,3-ethylenedioxy-5-androstene-11,17-dione in 0.7 ml. of anhydrous tetrahydrofuran is then added. The reaction mixture is kept at room temperature for 21 hours under stirring and then poured into ice-water. The product is extracted with ether, washed with water, dried over anhydrous sodium sulfate and evaporated to dryness to yield 171 mg. of residue. The residue is dissolved in 3.0 ml. of benzene and then 1.088 g. of sodium acetate, 480 mg. of acetic acid and 3.0 ml. of water are added. The resulting mixture is kept at room temperature for 21 hours under stirring and the product is extracted with ether, washed with water and evaporated to dryness to yield 126 mg. of residue, which is passed through a column of 4 g. of alumina. Eluate with benzene or benzene-dichloromethane is recrystallized from dichloromethane-ether to afford 53.2 mg. of 3,3-ethylenedioxy-11-oxo-5,17(20)-pregnadien-21-al (72.8% yield) having m.p. 208–212° C. $[\alpha]_D^{23}$ —47.6°±2.2° (c.=0.397: chloroform). Anal.—Calcd. for $C_{23}H_{30}O_4$: C, 74.56; H, 8.16. Found: C, 74.29; H, 8.14.

EXAMPLE 19

1-formylmethylene-6-methoxytetraline

To a mixture of 155 mg. of 52.9% sodium hydride and 1.0 ml. of tetrahydrofuran, there is added a solution of 892 mg. of diethylphosphonoacetaldehyde cyclohexylamine enamine in 2.0 ml. of anhydrous tetrahydrofuran under ice-cooling and stirring, and then stirring is continued for 15 minutes. A solution of 200 mg. of 6-methoxy-α-tetralone in 2.0 ml. of anhydrous tetrahydrofuran is then added and the resulting solution is kept at room temperature for 6.5 hours under stirring. The reaction mixture is then poured into ice-water, extracted with ether, washed with water, dried over anhydrous sodium sulfate and then evaporated to dryness to yield 790 mg. of syrupy residue. The residue is dissolved in 29 ml. of benzene and then 868 mg. of oxalic acid and 86 ml. of water are added. The mixture is kept at room temperature for 13 hours under stirring and then extracted with ether. Ether extract is washed with water, dried over anhydrous sodium sulfate and evaporated to dryness to yield 114 mg. of crystalline residue, which on recrystallization from dichloromethane-ether affords 34 mg. of 1-formylmethylene-6-methoxytetraline (31% yield) having m.p. 89–90° C.

IR: $\nu_{max.}^{CHCl_3}$ 2774, 1656, 1610, 1591, 1151 cm.$^{-1}$.

Anal.—Calcd. for $C_{13}H_{14}O_2$: C, 77.20; H, 6.98. Found: C, 76.85; H, 7.01.

EXAMPLE 20

According to the similar procedure as described above, α-(2,6,6-trimethyl-1-cyclohexenyl)-acetaldehyde is converted to α-(2,6,6-trimethyl-1-cyclohexenyl)-α-methylcrotonic aldehyde (b.p. 99–103° C./0.5 mm. Hg; identified as semicarbazone: m.p. 155–157° C.), cinnamalacetaldehyde to 7-phenylheptatrienal (m.p. 114–116° C.), and 2,7-dimethylocta-2,6-dien-4-yne-1,8-dial to 4,9-dimethyldodeca-2,4,8,10-tetraen-6-yne-1,12-dial (m.p. 162–163° C.), respectively.

EXAMPLE 21

Cinnamic aldehyde

To a mixture of 590 mg. of 52.9% sodium hydride and 6.0 ml. of tetrahydrofuran, there is added a solution of of 3.80 g. of ethyl-2-cyclohexylaminovinyl phenylphosphinate in 20 ml. of anhydrous tetrahydrofuran and then the mixture is stirred for 20 minutes. A solution of 1.06 g. of benzaldehyde in 11 ml. of anhydrous tetrahydrofuran is then added and the resulting solution is kept at room temperature for 4 hours under stirring. The reaction mixture is then added into ice-water, extracted with ether, washed with water, dried over anhydrous sodium sulfate and evaporated to yield 3.16 g. of residue. To a solution of this residue in 100 ml. of benzene, there is added 1.0 g. of oxalic acid and 300 ml. of water and the solution is then stirred for 14 hours at room temperature. Benzene layer is separated and the aqueous layer extracted with ether. The extract combined with the benzene layer is washed with water, dried over anhydrous sodium sulfate and evaporated to dryness to yield 1.37 g. of residue, which on purification by vacuum distillation affords 0.96 g. of cinnamic aldehyde (72.5% yield) having b.p. 78° C./1.0 M mm. Hg.

EXAMPLE 22

α-Methylcinnamic aldehyde

To a mixture of 318 mg. of 52.9% sodium hydride and 3.0 ml. of tetrahydrofuran, there is added a solution of 2.15 g. of ethyl-(2-cyclohexylamino-1-methyl)vinyl phenylphosphinate in 12 ml. of anhydrous tetrahydrofuran, and then the mixture is stirred for 20 minutes. A solution of 530 mg. of benzaldehyde in 5.0 ml. of anhydrous tetrahydrofuran is then added and the resulting solution is kept at room temperature for 20 hours under stirring. According to the same procedure as Example 21, the reaction mixture is treated and then hydrolyzed with oxalic acid. The resulting product is purified by vacuum distillation to afford 469 mg. of α-methylcinnamic aldehyde (64.3% yield) having b.p. 131–132° C./1.6 mm. Hg, identified as semicarbazone: m.p. 206–208° C. Anal.—Calcd. for $C_{11}H_{13}ON_3$: C, 65.00; H, 6.45; N, 20.68. Found: C, 65.13; H, 6.29; N, 20.51.

EXAMPLE 23

β-Phenylcynnamic aldehyde

To a mixture of 18 mg. of 52.9% sodium hydride and 3.0 ml. of tetrahydrofuran, there is added a solution of 2.05 g. of ethyl-2-cyclohexylaminovinyl phenylphosphinate in 11 ml. of anhydrous tetrahydrofuran, and then the mixture is stirred for 20 minutes. A solution of 911 mg. of benzophenone in 9.0 ml. of anhydrous tetrahydrofuran is then added and the resulting solution is kept at room temperature for 8 hours under stirring. According to the same procedure as Example 21, the reaction mixture is treated and then hydrolyzed with oxalic acid. The resulting product is recrystallized from petroleum ether to afford 655 mg. of β-phenylcynnamic aldehyde (63.0% yield) as yellowish crystals having m.p. 44.0–45.5° C.

IR: $\nu_{max.}^{CHCl_3}$ 2750, 1655, 1600, 1580, 1235, 1155, 870 cm.$^{-1}$.

Anal.—Calcd. for $C_{15}H_{12}O$: C, 86.51; H, 5.81. Found: C, 86.66; H, 5.90. Semicarbazone: m.p. 214–215° C.

EXAMPLE 24

2-cyclohexylidenepropionaldehyde

To a mixture of 218 mg. of 52.9% sodium hydride and 2.0 ml. of tetrahydrofuran, there is added a solution of 1.23 g. of ethyl-(2-cyclohexylamino-1-methyl)vinyl phenylphosphinate in 5 ml. of anhydrous tetrahydrofuran, and the mixture is stirred for 20 minutes. A solution of 294 mg. of cyclohexanone in 3.0 ml. of anhydrous tetrahydrofuran is then added and the resulting solution is kept at room temperature for 7 hours under stirring. The reaction mixture is poured into ice-water, extracted with ether, washed with saturated sodium chloride aqueous solution and further extracted with 20% tartaric acid solution to remove the basic portion. The tartaric acid layer is treated with potassium carbonate under ice-cooling to make slightly basic. The product is then extracted with ether, washed with saturated sodium chloride aqueous solution and evaporated to dryness to yield crude crystals, which on recrystallization from ether-pentane afford the Schiff-base intermediate, having M.P. 77–78° C., which is identical with an authentic specimen prepared in Example 16.

According to the same procedure as Example 16, this intermediate is hydrolyzed with oxalic acid in benzene and the product is purified by vacuum distillation to afford 324 mg. of 2-cyclohexylidenepropionaldehyde (58.8% yield) which is identified as 2,4-dinitrophenylhydrazone (m.p. 187–190° C.).

EXAMPLE 25

3-formylmethylene-5α-androstan-17β-ol benzoate

To a mixture of 59 mg. of 52.9% sodium hydride and 1 ml. of tetrahydrofuran, there is added a solution of 380 mg. of ethyl-2-cyclohexylaminovinyl phenylphosphinate in 2.0 ml. of anhydrous tetrahydrofuran, and the mixture is then stirred for 20 minutes. A solution of 395 mg. of 17β-benzoyloxy-5α-androstan-3-one in 3.0 ml. of anhydrous tetrahydrofuran is added and the resulting solution is kept at room temperature for 6.5 hours under stirring. According to the same procedure as Example 21, the reaction mixture is treated and then hydrolyzed with oxalic acid. The resulting product is recrystallized from ether to afford 298 mg. of 3-formylmethylene-5α-androstan-17β-ol benzoate (71.0% yield), having m.p. 157–158° C., which is identical with an authentic specimen prepared in Example 9.

EXAMPLE 26

17(20)-5α-pregnen-21-al

Reaction of 5α-androstan-17-one with ethyl-2-cyclohexylaminovinyl phenylphosphinate, according to the same procedure as Example 25, affords 17(20)-5α-pregnen-21-al (recrystallized from ether) having m.p. 150–152° C. in about 70% yield, which is identical with an authentic specimen prepared in Example 12.

EXAMPLE 27

5α-formylethylenepregnane-3,20-dione

According to the same procedure as Example 25, 3,3:20,20-bisethylenedioxy-5α-formylpregnane is subjected to reaction with ethyl-2-cyclohexylaminovinyl phenylphosphinate. Hydrolysis with oxalic acid and subsequent deketallization with 70% acetic acid at 60–70° C. afford 5α-formylethylenepregnane-3,20-dione having m.p. 140–144° C. in about 75% yield, which is identical with an authentic specimen prepared in Example 11.

EXAMPLE 28

2-cyclohexylidene-3-phenylpropionaldehyde

To a mixture of 364 mg. of 52.9% sodium hydride and 3.5 ml. of tetrahydrofuran, there is added a solution of 3.07 g. of ethyl-(1-benzyl-2-cyclohexylamino)vinyl phenylphosphinate in 4.0 ml. of anhydrous tetrahydrofuran under ice-cooling and stirring, and the mixture is then stirred for 20 minutes. A solution of 393 mg. of cyclohexanone in 4.0 ml. of anhydrous tetrahydrofuran is added and the resulting solution is refluxed for 4 hours. After cooling, the reaction mixture is poured into ice-water, extracted with ether, then treated in the same manner as Example 21, and then further hydrolyzed with oxalic acid. The product is purified by passing through a column of silica gel to afford 411 mg. of 2-cyclohexylidene-3-phenylpropionaldehyde (48.1% yield), which is converted to 2,4-dinitrophenylhydrazone identical with an authentic specimen prepared in Example 17.

EXAMPLE 29

3,3-ethylenedioxy-11-oxo-5,17(21)-pregnadien-21-al

To a mixture of 136 mg. of 52.9% sodium hydride and 1.0 ml. of tetrahydrofuran, there is added a solution of 880 mg. of ethyl-2-cyclohexylaminovinyl phenylphosphinate in 7 ml. of anhydrous tetrahydrofuran, and the mixture is then stirred for 20 minutes under ice-cooling. A solution of 340 mg. of 3,3-ethylenedioxy-5-androstene-11,17-dione in 3 ml. of anhydrous tetrahydrofuran is added and the resulting solution is kept at room temperature for 24 hours under stirring. The reaction mixture is poured into ice-water, extracted with ether, washed with water, dried over anhydrous sodium sulfate and evaporated to dryness to yield 930 mg. of residue. To a solution of this residue in 16 ml. of benzene, there is added 5.3 g. of sodium acetate, 2.31 g. of acetic acid and 16 ml. of water, and the resulting mixture is kept at room temperature for 21 hours under stirring. The product is extracted with ether, washed with water and evaporated to dryness to yield a residue, which on crystallization from dichloromethane-ether affords 263 mg. of 3,3-ethylenedioxy - 11 - oxo-5,17(20)-pregnadien-21-al (71.0% yield) having m.p. 208–212° C., which is identical with an authentic specimen prepared in Example 18.

We claim:

1. A process for preparing a compound of the formula:

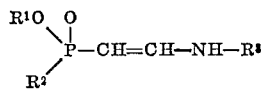

wherein $R^1$ is a lower alkyl group, $R^2$ is a member selected from the group consisting of $R^1O$, a lower alkyl group, an aralkyl group of 7–8 carbon atoms and an aryl group of 6–7 carbon atoms, and $R^3$ is a member selected from the group consisting of an acyclic or cyclic alkyl group of 1–6 carbon atoms and an aryl group of 6–7 carbon atoms, which comprises reacting a compound of the formula:

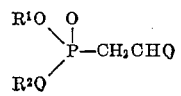

wherein $R^1$ and $R^2$ each has the same meanings as described above, with a compound of the formula:

$$R^3-NH_2$$

wherein $R^3$ has the same meanings as described above, in an organic solvent at a temperature ranging from 0° C. to 120° C.

2. A process as claimed in claim 1, wherein an organic solvent is a member selected from the group consisting of methanol, ethanol, n-propanol, t-butanol, benzene, toluene and tetrahydrofuran.

References Cited

UNITED STATES PATENTS 3,337,563    8/1967    Skaletzky  ------ 260—583 H X

OTHER REFERENCES

West, "Jor. of Chemical Education," vol. 40, No. 4, 1963, pp. 194–200.

ANTON H. SUTTO, Primary Examiner

U.S. Cl. X.R.

260—944